Aug. 13, 1963 J. T. MAUPIN 3,100,877
TRANSISTOR AMPLIFIER WITH CONSTANT INPUT IMPEDANCE
Filed Dec. 27, 1960

INVENTOR.
JOSEPH T. MAUPIN
BY Osmund A. Dahle
ATTORNEY

United States Patent Office 3,100,877

Patented Aug. 13, 1963

3,100,877
TRANSISTOR AMPLIFIER WITH CONSTANT INPUT IMPEDANCE

Joseph T. Maupin, Deephaven, Minn., assignor to Minneapolis-Honeywell Regulator Company, Minneapolis, Minn., a corporation of Delaware Filed Dec. 27, 1960, Ser. No. 78,368
5 Claims. (Cl. 330—28)

This invention relates generally to a transistor amplifier circuit and is more particularly directed towards a single stage transistor amplifier having a constant input impedance. The circuit is arranged and components are chosen such that the input impedance is independent of transistor gain and of the amount of feedback.

A well known passive circuit is the bridged-T configuration generally shown in FIGURE 4 of the drawings. Of particular interest in this invention is the constant resistance bridged T in which, according to the showing of FIGURE 4, if $Z_{12}Z_{21}=R_0^2$ the input impedance is a constant resistance equal to $R_0$. This is clearly taught in the text, "Network Analysis and Feedback Amplifier Design," page 272, by Bode, published by D. Van Nostrand Company, 1945.

An equivalent circuit for a transistor may be shown in the form of a T-network as shown for the common emitter configuration in FIGURE 5. Assuming the transistor equivalent circuit is terminated in a load resistance $R_L$, and that an external shunt feedback element $Z_f$ or $R_f$ is added, as in FIGURE 2, it can be seen that an "active" instead of a passive bridged-T network has been provided. Let it be assumed that the elements of the "active" network can be adjusted to conform to the "constant resistance" conditions of the passive network. This may involve the addition of a series resistance $R_b$ in the base lead and a series impedance $Z_e$ or $R_e$ in the emitter lead as shown in FIGURE 2. In achieving the adjustment the following relations should hold, $(R_b+r_b)=R_L$, and $Z_f(Z_e+r_e)=R_L^2$.

Analysis of the properties of this "active" network show that the input impedance is the same as it would be if the transistor were dead ($b=0$). The input impedance is independent of transistor gain and of the amount of feedback as long as the passive bridge balance conditions apply. Contrariwise if either shunt or series feedback only is used, the input impedance is strongly dependent on both the transistor gain and the amount of feedback.

It is therefore an object of this invention to provide an improved transistor circuit having a constant input impedance.

It is a further object of the invention to provide a transistor amplifier having a constant input impedance, which input impedance is equal to the output terminating resistance.

These and other objects of the invention will be apparent from a consideration of the appended specification, claims, and drawing in which FIGURE 1 is a schematic drawing of the circuit embodying the invention;

Figure 1:
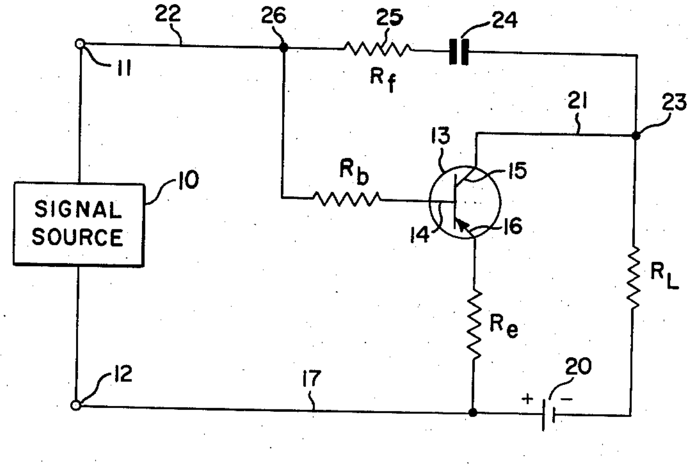

Referring now to FIGURE 1, a source of signal 10 is shown having its output connected to input terminals 11 and 12 of an amplifier circuit. The amplifier includes an amplifying device 13, here shown as a pnp type transistor.

Transistor 13 has a semiconductive body and a control or base electrode 14, an output or collector electrode 15, and an emitter electrode 16. The emitter electrode 16 is connected through an emitter resistor $R_e$ and a conductor 17 to input terminal 12, conductor 17 also being connected to the positive terminal of a source of potential 20. The negative terminal of source 20 is connected through a load $R_L$, here shown as a resistive element, and a conductor 21 to the collector electrode 15.

The base electrode 14 is connected through a base resistance $R_b$ and a conductor 22 to the other input terminal 11. A feedback path may be traced from a junction 23 on the conductor 21 through a capacitor 24 and a resistor 25 to a junction 26 on the conductor 22.

Figure 2:
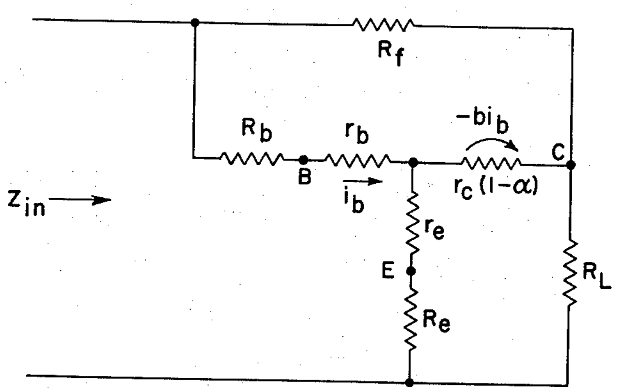
FIGURES 2 and 3 are partial schematics for the purpose of aiding in the explanation of the invention of the circuit of FIGURE 1.

In the simplified circuit of FIGURE 2 the transistor 13 is replaced by an equivalent circuit which approximates the transistor structure. The base electrode is replaced by $r_b$ the ohmic resistance within the transistor between the base and the junctions. The emitter electrode is replaced by a resistor $r_e$, the internal resistance of the emitter. The collector is represented by a resistance $r_c\ (1-\alpha)$. Further consideration of the circuit of FIGURE 2 shows that it may be presented as a bridge circuit in which the resistors $R_f$ and $R_L$ form one set of legs for the bridge and in which $R_b+r_b$ and $r_e+R_e$ form the second set of legs for the bridge.

Figures 3, 4:
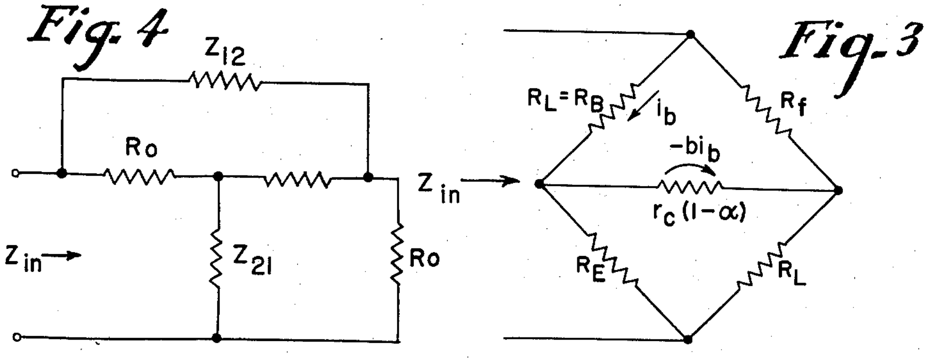
FIGURE 4 is a schematic of a prior art passive bridged-T network.
Figure 5:
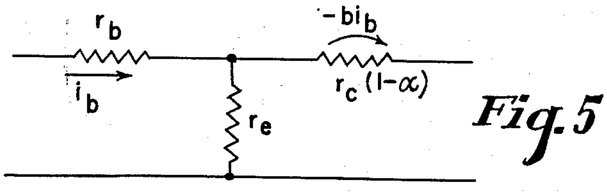
FIGURE 5 is an equivalent circuit schematic for a transistor.

The bridge arrangement is shown in FIGURE 3. $R_b+r_b$ are combined and shown as $R_B$ and $r_e+R_e$ are similarly shown as $R_E$. It will be noted that the transistor collector circuit represented by $r_c\ (1-\alpha)$ is now "across" the bridge. Under these conditions if the bridge is maintained balanced, the conductivity of the transistor is immaterial; it makes no difference whether $r_c$ is shorted or opened. For a balanced bridge under passive conditions the product of $R_BR_L=R_fR_E$.

The value of $R_L$ being known, let us assume that $R_b$ is chosen of a magnitude such that $R_b+r_b=R_L$. Then the equation for passive balance becomes $R_L^2=R_fR_e$ and the input impedance $Z_{in}=R_L$. Referring now to the active circuit including the transistor, I have discovered and analytically proven from a network analysis of this active circuit that its input impedance is also a constant resistance equal to the load resistance, as illustrated in FIGURE 2 or 3, i.e. $Z_{in}=R_L$. This analytical proof has been experimentally verified. This relationship $Z_{in}=R_L$ exists independent of transistor gain and also is independent of the amount of feedback. In any other feedback circuit which does not adhere to these conditions the input impedance is not constant but is a direct function of transistor gain and the amount of feedback. In FIGURES 2 and 3 $R_f$ has been shown as purely resistive, however, it is not necessarily so limited as long as the above relationships are met.

The voltage gain $E_{out}/E_{in}$ is therefore a simple function of transistor gain and of the transmission of a passive bridged-T circuit, as in FIGURE 2, having the same element values.

In general, while I have shown a specific embodiment of my invention, it is to be understood this is for the purpose of illustration and that my invention is to be limited solely by the scope of the appended claims.

I claim:

1. An amplifier circuit having a constant input impedance comprising: a transistor having a semiconductive body and a plurality of electrodes including a base electrode, an emitter electrode and a collector electrode, said base electrode having an internal resistance $r_b$ and said emitter electrode having an internal resistance $r_e$; an emitter resistor $R_e$ connecting said emitter electrode to a reference potential point; a base resistor $R_b$ connecting said base electrode to a source of signal to be amplified; impedance load means $R_L$; a source of potential, said load means connecting said source of potential to said collector electrode; a feedback resistor $R_f$ connected between said collector electrode and said base resistor; said components being proportioned in accordance with the equation $$R_L(r_b+R_b)=R_f(R_e+r_e)$$

to cause the input impedance of the amplifier to be a constant value.

2. An amplifier circuit having a constant input impedance comprising: a source of signal to be amplified, said signal source having a terminal to be connected to a point of reference potential and an output terminal; a transistor having a semiconductive body and a plurality of electrodes including a base electrode, an emitter electrode and a collector electrode, said base electrode having an internal resistance $r_b$ and said emitter electrode having an internal esistance $r_e$; an emitter resistor $R_e$ connecting said emitter electrode to said reference potential point; a base resistor $R_b$ connecting said base electrode to said signal source output terminal; impedance load means $R_L$; a source of potential having one terminal connected to said reference potential point, said load means connecting the other terminal of said source of potential to said collector electrode; a feedback resistor $R_f$ connected between said collector electrode and said signal source output terminal said components being proportioned in accordance with the equation $$R_L(r_b+R_b)=R_f(R_e+r_e)$$

to cause the input impedance of the amplifier to be a constant value.

3. An amplifier circuit having a constant input impedance which is equal to the load impedance $R_L$ comprising: a transistor having a semiconductive body and a plurality of electrodes including a base electrode, an emitter electrode and a collector electrode, said base electrode having an internal resistance $r_b$ and said emitter electrode having an internal resistance $r_e$; an emitter resistor $R_e$ connecting said emitter electrode to a reference potential point; a source of signal to be amplified; a base resistor $R_b$ connecting said base electrode to a terminal of said signal source; impedance load means $R_L$; a source of potential, said load means connecting said source of potential to said collector electrode; a feedback resistor $R_f$ connected between said collector electrode and said signal source terminal; said components being proportioned in accordance with the equations $$R_L=r_b+R_b$$

and $$R_L(r_b+R_b)=R_f(R_e+r_e)$$

substituting $$R_L^2=R_f(R_e+r_e)$$

to cause the input impedance of the amplifier to equal the load impedance $R_L$.

4. Transistor amplifier apparatus having a constant input impedance comprising: a transistor having a plurality of electrodes including an emitter electrode, a base electrode, and a collector electrode, said emitter, base and collector each having an internal resistive component; an emitter resistor connected from said emitter electrode to a point of reference potential; a source of potential; load means connected from said collector electrode to said source; a base resistor; a source of signal having one terminal connected to said reference potential point and the other terminal connected through said base resistor to said base electrode; a feedback resistor connected from said collector electrode to said base resistor; the components being chosen so that the product of the load means resistance and the base resistor including the internal base resistance is equal to the product of the feedback resistor and the emitter resistor including the internal emitter resistance.

5. Transistor amplifier apparatus having a constant input impedance which is equal to the load resistance comprising: a transistor having a plurality of electrodes including an emitter electrode, a base electrode, and a collector electrode, said emitter, base and collector each having an internal resistive component; an emitter resistor connected from said emitter electrode to a point of reference potential; a source of potential; load means interconnecting said collector electrode to said source; a base resistor; a source of signal having one terminal connected to said reference potential point and the other terminal connected through said base resistor to said base electrode; a feedback resistor connected from said collector electrode to said signal source other terminal; the components being chosen so that the magnitude of the sum of the base resistor and the internal base resistive component is equal to the load resistance and that the product of the load means resistance and the base resistor including the internal base resistance is equal to the product of the feedback resistor and the emitter resistor including the internal emitter resistance.

References Cited in the file of this patent

UNITED STATES PATENTS

| | | |
|---|---|---|
| 2,977,546 | Molnar | Mar. 28, 1961 |
| 2,994,040 | Waldhauer | July 25, 1961 |
| 2,995,712 | Montgomery | Aug. 8, 1961 |